Figure 1:
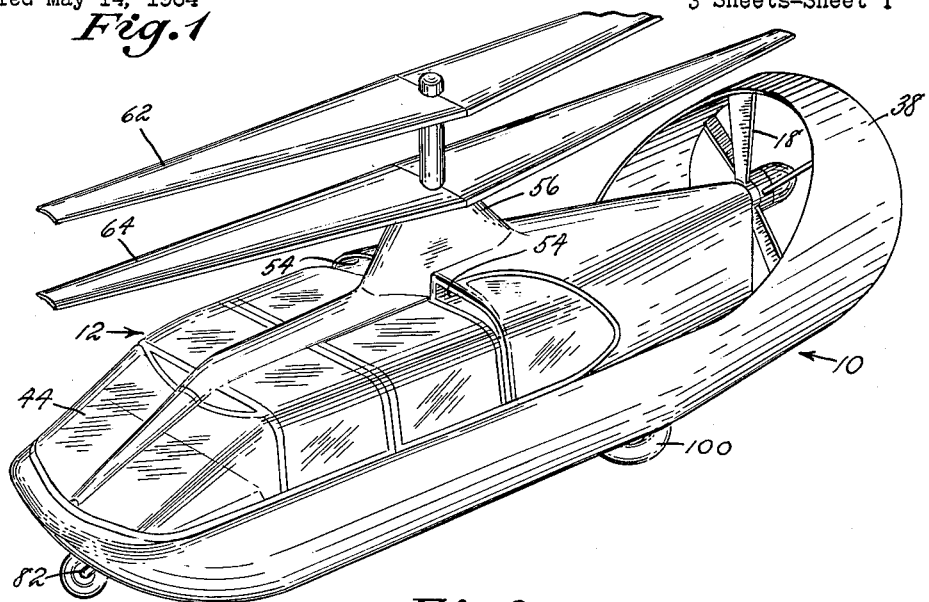

July 19, 1966 C. E. GORTON 3,261,572
TRIPHIBIOUS VEHICLE
Filed May 14, 1964 3 Sheets-Sheet 1

July 19, 1966  C. E. GORTON  3,261,572
TRIPHIBIOUS VEHICLE

Filed May 14, 1964  3 Sheets-Sheet 2

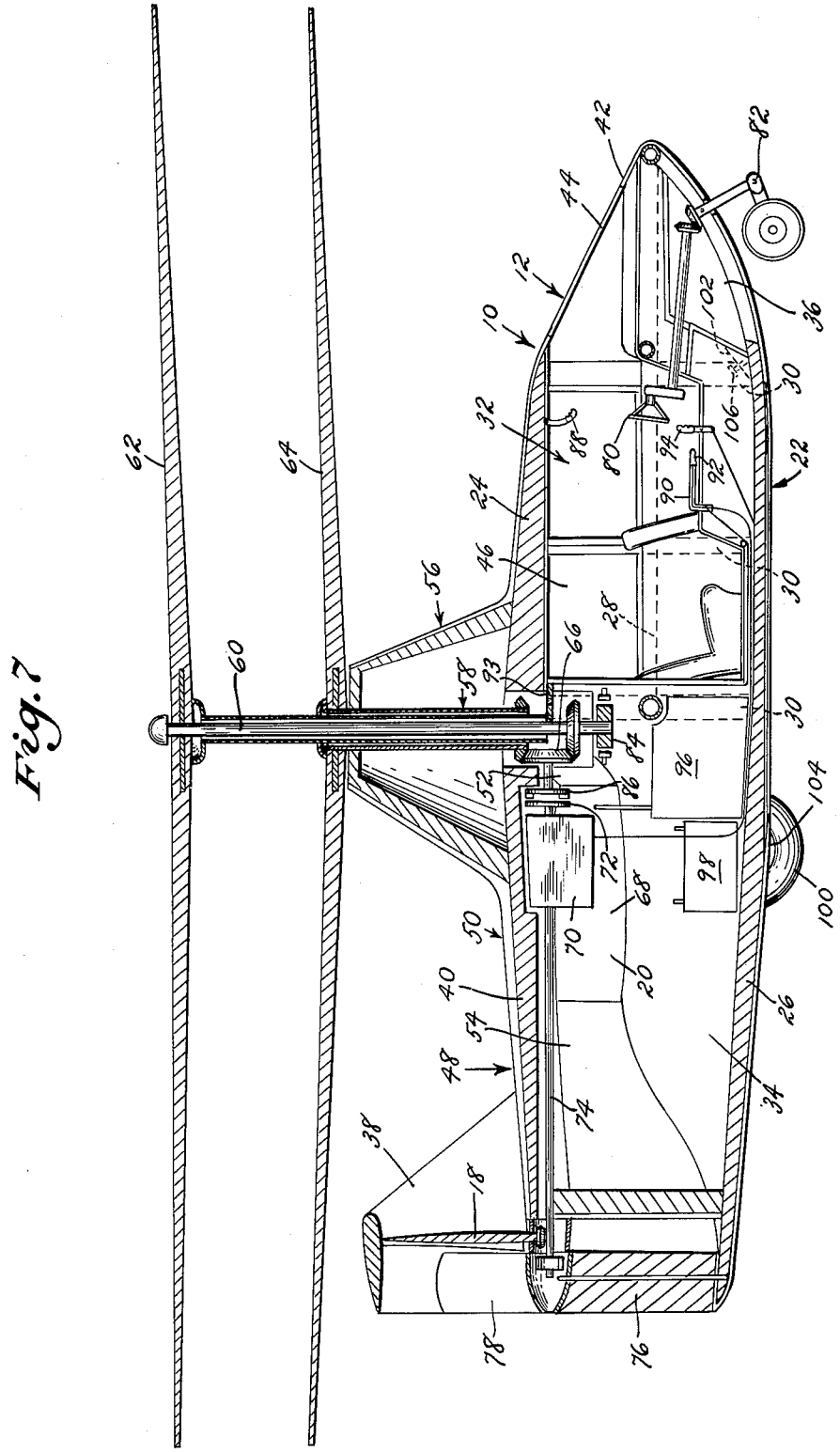

United States Patent Office 3,261,572
Patented July 19, 1966

3,261,572
TRIPHIBIOUS VEHICLE
Carl E. Gorton, 76 Lockwood Ave., Farmingdale,
Long Island, N.Y.
Filed May 14, 1964, Ser. No. 367,088
12 Claims. (Cl. 244—2)

This invention pertains to a utility transportation vehicle capable of operating as an aircraft, boat, and car. More specifically, the vehicle can operate as a helicopter, autogyro, and an airplane in the air; as a propeller or electric car on the ground; and as an air boat on the water.

Presently, attempts to combine the above mentioned features have proved impractical since none of the attempted constructions were capable of providing optimum operating characteristics in each of the modes of travel. Likewise, previous convertiplanes have suffered from increased complexity and have also suffered from loss of performance either as a helicopter or airplane or both.

Accordingly, it is among the principal objects of the present invention to provide a vehicle of the character described which is capable of the aforementioned modes of operation. The requirements for a practical combination vehicle of this nature include the following:
  (a) No external conversion, attachments, or adjustments for converting from one mode to another.
  (b) Simplicity of control.
  (c) Economy of operation.
  (d) Performance equivalent to the pure vehicle.
  (e) Safety and reliability.

It is a further object of the present invention to provide a vehicle of the character described which operates at optimum performance in its air mode of operation.

Yet a further object of the present invention is to provide a vehicle of the character described which operates at optimum performance in its ground and water mode of operation.

A feature of the invention lies in the fact that the same may be manufactured using many existing elements and manufacturing techniques well known in the art.

The invention consists of a standard type airframe fuselage, the lower half of which is a modified planing hull blending into a large rear ring duct. Extending upwardly from the fuselage is a pylon housing two co-axial rotor shafts mounting rotor-wings of lenticular cross section. The shafts are connected to a power source, which also drives a variable pitch propeller surrounded by the ring duct. A rudder and elevators are mounted in the duct behind the propeller. Control of the vehicle is by conventional means. Additional electrical power means may be provided to drive the vehicle on the ground.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 2:
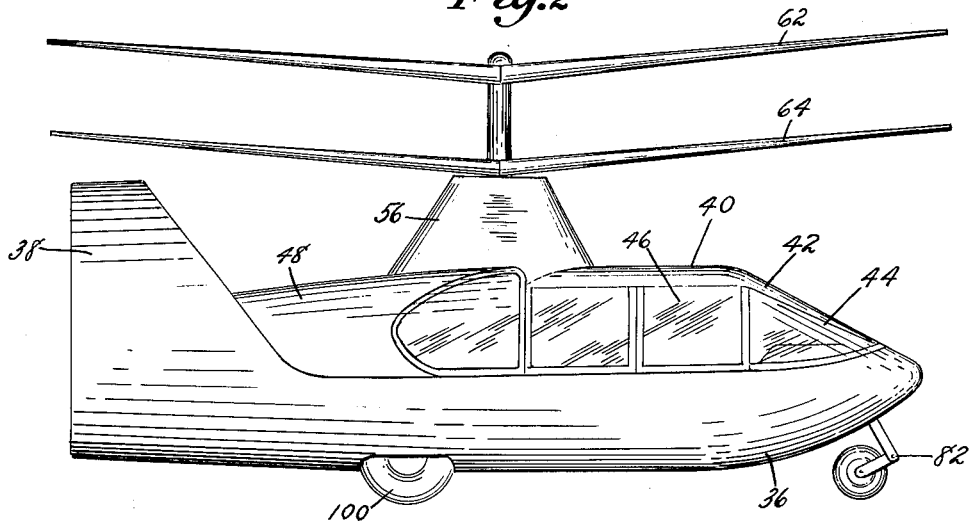
Figure 3:
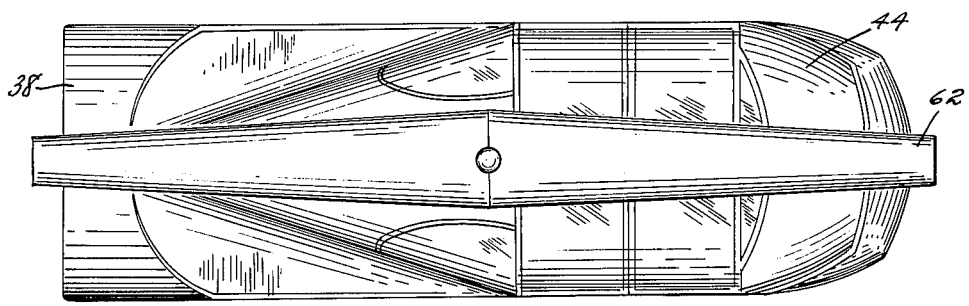
Figure 4:
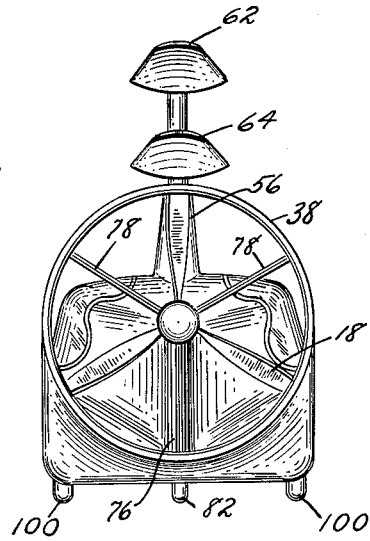
Figure 5:
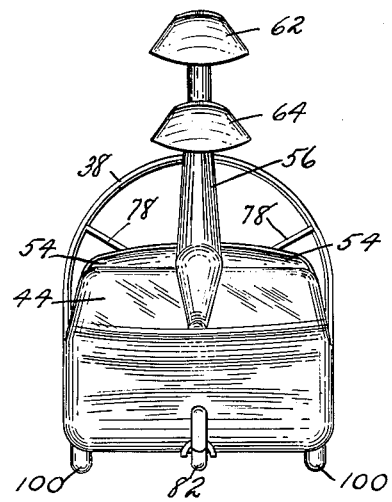
Figure 6:
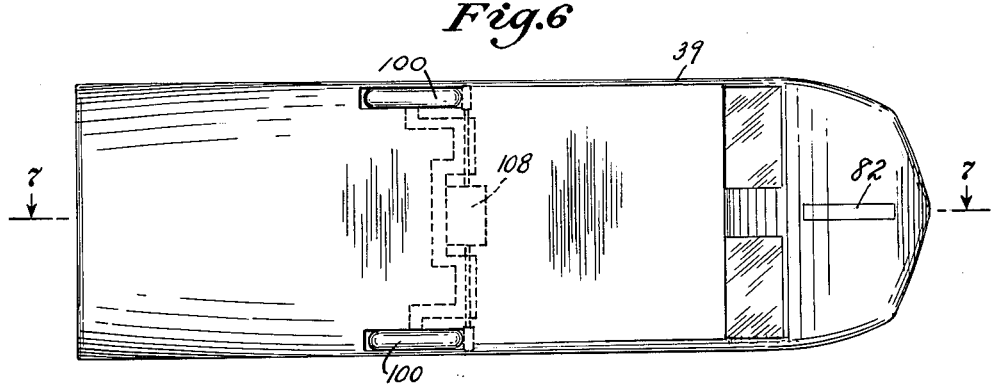

FIGURE 1 is a top perspective view looking toward the leftside of the vehicle.
FIGURE 2 is a side elevational view.
FIGURE 3 is a top plan view.
FIGURE 4 is a rear elevational view, and
FIGURE 5 is a front elevational view.
FIGURE 6 is a bottom plan view.
FIGURE 7 is a cross-sectional view as seen from the plane 7—7 on FIGURE 6.

In accordance with the invention, the vehicle, generally indicated by the reference character 10, comprises broadly a fuselage 12, two coaxial rotors 62 and 64, a rear mounted propeller 18, and power means 20.

More particularly, the fuselage 12 has a framework 22 comprising a primary load carrying dorsal beam 24 attached to keel beams 26 and gunwhale beams 28 by rib members 30 which define the cockpit 32 and engine section 34. The preferred frame material is extruded and tubular titanium.

The lower half of the fuselage 12 is in the shape of a modified planing hull 36 which is faired smoothly into and forms a large ring or duct 38 at the rear. Increased downward visibility is obtained through plexiglass panels 39 mounted in the hull. The upper half 40 of the fuselage consists of two main sections, the front portion 42 of which comprises the windshield 44 and sliding cockpit canopy 46 composed of plexiglass, and a rear portion 48 which includes a removable cowling 50 for the power means 20, and intake and exhaust ducts 52 and 54 for combustion air and exhaust. The preferred skin material for the hull 36, ducts 52 and 54, and cowling 50 is molded fiberglass or expanded Royalite.

Extending above the mid-section of the fuselage 12 is a rotor pylon or mast 56. Extending upwardly from within the pylon are coaxial rotor shafts 58 and 60.

Rigidly secured to the rotor shaft are rotor-wings 62 and 64 of lenticular cross-section and tapered plan form. The rotor wings are driven during the helicopter mode through a bevel gear transmission 66, which also maintains the rotor wings in alignment at the quadrature positions.

The power means 20 comprises either one or more gas turbine engines 68. Power from the engines is supplied to the transmission 66 through a combining and reduction gear assembly 70 of conventional design, and a mechanical clutch 72. The output from the gear assembly is also transmitted to the variable pitch propeller 18 through a shaft 74. The propeller is surrounded by the duct 38. Mounted within the duct are a rudder 76 and elevators 78 directly behind the propeller 18. The rudder and the elevators are attached to a control wheel 80 by conventional means. The control wheel is pivotable to either side of the cockpit and is connected to the retractable nose wheel 82.

Secured to the coaxial rotor shafts 58 and 60 within the fuselage 12 is a rotor brake and detent 84 The brake and detent is connected through a rotor clutch 86 to a rotor brake-clutch control 88 by conventional means. A rotor collective pitch control 90 and engine throttle 92 are connected to the engine 68 and a rotor blade pitch mechanism 93 by conventional means. The propeller pitch control 94 is connected to the propeller 18 by conventional means.

Fuel tanks 96 and batteries 98 are centrally located. The batteries supply power for engine starting and to means 108 for driving retractable main wheels 100. Electrical power control is accomplished by conventional means with means (not shown) for connection to a foot control 102. Conventional wheel brakes 104 are attached to the main wheels 100 with means (not shown) for connection to a foot control 106.

Control of vehicle on land and water is similar to conventional cars and boats. The rotors are locked in longitudinal position. Directional control during all modes of operation is accomplished only by the control wheel. As a car, drive power may be supplied by the propeller as in water and air, or by direct drive to the main wheels. Operation as a helicopter is simplified since no directional control foot pedals are required. To rise or descend vertically, power and rotor blade pitch are increased to the required degree with the collective pitch control and throttle. Conversion to autogyro operation is accomplished by increasing the propeller pitch, decreasing the rotor blade pitch to zero and de-clutching the rotor drive. Conversion to airplane operation is then accomplished by simply braking the rotors which automatically lock in lateral position and become fixed wings. Airplane control is accomplished entirely with the control wheel, with coordinated turns provided due to the roll-moment developed by differential elevon action. Conversion back to a helicopter is accomplished in reverse order.

In summary, this invention meets or exceeds all of the previously set forth requirements for a practical triphibious convertiplane for the following reasons:

(a) No external conversion, attachments or adjustments are required for converting from one mode of operation to another as described herein.

(b) Control as a car or boat is identical to those craft. Control as a helicopter and airplane simplified due to the elimination of foot pedals since directional control is provided by the propeller and directional control by the control wheel and rudder.

(c) Economy of operation as an airplane is increased due to the low wing area which reduces drag and the propeller duct which increases thrust efficiency.

(d) Since the requirements for high speed and low speed flight do not conflict in this invention, compromises are not required which reduce performance in any mode of operation. Therefore, the design is optimized for all modes of operation and maximum performance and economy are realized.

(e) the capability of auto-rotational landings on any surface and within a small area insures the safety of emergency or precautionary landings. Two engine configuration and overall design simplicity increases reliability to an extremely high level. Safety of surface operation is insured by the duct which prevents accidental contact with the propeller.

What is claimed is:

1. In combination in an improved triphibious vehicle
 (a) a fuselage,
 (b) at least two coaxial rotors operatively secured to the fuselage;
 (c) a rear mounted propeller operatively secured to the fuselage,
 (d) power means powering the rotors and the propeller, and
 (e) braking means to arrest rotation of the said rotor-wings during flight in a detent position and retaining them in the said position, the rotor-wings then functioning as fixed wings with the said rear mounted propeller providing thrust.

2. In combination in an improved triphibious vehicle
 (a) a fuselage,
 (b) at least two coaxial lenticular rotors operatively secured to the fuselage;
 (c) a rear mounted propeller operatively secured to the fuselage,
 (d) power means powering the rotors and the propeller, and
 (e) braking means to arrest rotation of the said rotor-wings during flight in a detent position and retaining them in the said position, the rotor-wings then functioning as fixed wings with the said rear mounted propeller providing thrust.

3. In combination in an improved triphibious vehicle
 (a) a fuselage,
 (b) at least two coaxial rotors operatively secured to the fuselage;
 (c) a rear mounted ducted propeller operatively secured to the fuselage,
 (d) power means powering the rotors and the propeller, and
 (e) braking means to arrest rotation of the said rotor-wings during flight in a detent position and retaining them in the said position, the rotor-wings then functioning as fixed wings with the said rear mounted propeller providing thrust.

4. In combination in an improved triphibious vehicle
 (a) a fuselage,
 (b) at least two coaxial rotors operatively secured to the fuselage;
 (c) a rear mounted propeller operatively secured to the fuselage,
 (d) power means powering the rotors and the propeller;
 (e) first power transmission connected to the power means and the rotors, and second power transmission means connected to the propeller and the power means, and
 (f) braking means to arrest rotation of the said rotor-wings during flight in a detent position and retaining them in the said position, the rotor-wings then functioning as fixed wings with the said rear mounted propeller providing thrust.

5. In combination in an improved triphibious vehicle
 (a) a fuselage,
 (b) at least two coaxial rotors operatively secured to the fuselage;
 (c) a rear mounted propeller operatively secured to the fuselage, and
 (d) power means powering the rotors and the propeller;
 (e) first power transmission connected to the power means and the rotors, and rotors, and second power transmission means connected to the propeller and the power means;
 (f) control means connected to the power means, the rotor and the propeller, and
 (g) braking means to arrest rotation of the said rotor-wings during flight in a detent position and retaining them in the said position, the rotor-wings then functioning as fixed wings with the said rear mounted propeller providing thrust.

6. An improved triphibious vehicle comprising:
 (a) a fuselage,
 (b) at least two coaxial lenticular rotors operatively secured to the fuselage by a mast, the rotors being rigidly secured to the mast;
 (c) a rear mounted propeller operatively secured to the fuselage,
 (d) power means powering the rotors and the propeller, and
 (e) braking means to arrest rotation of the said rotor-wings during flight in a detent position and retaining them in the said position, the rotor-wings then functioning as fixed wings with the said rear mounted propeller providing thrust.

7. An improved triphibious vehicle comprising:
 (a) a fuselage,
 (b) at least two coaxial rotors operatively secured to the fuselage;
 (c) a rear mounted propeller operatively secured to the fuselage, and
 (d) power means powering the rotors and the propeller;
 (e) first power transmission connected to the power means and the rotors, and second power transmission means connected to the propeller and the power means,
 (f) control means connected to the power means, the rotors, and the propeller, the control means including a collective pitch control and
 (g) braking means to arrest rotation of the said rotor-wings during flight in a detent position and retaining them in the said position, the rotor-wings then functioning as fixed wings with the said rear mounted propeller providing thrust.

8. An improved triphibious vehicle comprising:
 (a) a fuselage, having a lower part in a planing-hull shape,
 (b) at least two coaxial rotors operatively secured to the fuselage;

(c) a rear mounted propeller operatively secured to the fuselage, (d) power means powering the rotors and the propeller, and (e) braking means to arrest rotation of the said rotor-wings during flight in a detent position and retaining them in the said position, the rotor-wings then functioning as fixed wings with the said rear mounted propeller providing thrust.

9. The invention according to claim 8, the fuselage including a rotor mast located medially thereof.

10. The invention according to claim 9, the fuselage including means for downward vision.

11. The invention according to claim 1, including independent power drive means to the wheels for congested or city driving.

12. The invention according to claim 11, including independent electrical power means to drive the wheels for congested or city driving.

References Cited by the Examiner

UNITED STATES PATENTS

| | | | |
|---|---|---|---|
| 2,201,249 | 5/1940 | Tormollan | 114—66 |
| 2,396,419 | 3/1946 | Hassel | 244—2 |
| 2,424,769 | 7/1947 | Page | 244—2 |
| 2,427,936 | 9/1947 | Wales | 244—2 |
| 2,563,731 | 8/1951 | Masterson | 244—2 |
| 2,619,301 | 11/1952 | Hall | 244—2 |

FOREIGN PATENTS 1,265,234   5/1961   France.

FERGUS S. MIDDLETON, *Primary Examiner.*

R. G. BESHA, T. MAJOR, *Assistant Examiners.*